US007034822B2

(12) United States Patent
Gross et al.

(10) Patent No.: US 7,034,822 B2
(45) Date of Patent: Apr. 25, 2006

(54) SYSTEM AND METHOD FOR PRODUCING 3D VIDEO IMAGES

(75) Inventors: Markus Gross, Uster (CH); Edouard Lamboray, Zurich (CH); Stephan Würmlin, Zurich (CH)

(73) Assignee: Swiss Federal Institute of Technology Zurich, Zurich (CH)

( * ) Notice: Subject to any disclaimer, the term of this patent is extended or adjusted under 35 U.S.C. 154(b) by 343 days.

(21) Appl. No.: 10/464,364

(22) Filed: Jun. 18, 2003

(65) Prior Publication Data

US 2004/0046864 A1  Mar. 11, 2004

(51) Int. Cl.
  *G06T 15/00* (2006.01)
(52) U.S. Cl. ...................... 345/419; 345/473
(58) Field of Classification Search ................ 345/419, 345/420, 421, 422, 423, 424, 426, 427, 428, 345/473, 474, 475
  See application file for complete search history.

(56) References Cited

U.S. PATENT DOCUMENTS

| 5,239,624 | A | * | 8/1993 | Cook et al. ................. 345/611 |
| 5,764,243 | A | * | 6/1998 | Baldwin ...................... 345/506 |
| 6,144,765 | A | * | 11/2000 | Tamura et al. ............... 382/197 |
| 6,556,196 | B1 | * | 4/2003 | Blanz et al. ................. 345/419 |
| 6,567,081 | B1 | * | 5/2003 | Li et al. ...................... 345/419 |
| 6,639,597 | B1 | * | 10/2003 | Zwicker et al. ............. 345/427 |
| 6,674,430 | B1 | * | 1/2004 | Kaufman et al. ............ 345/419 |
| 6,744,435 | B1 | * | 6/2004 | Zwicker et al. ............. 345/424 |
| 6,903,738 | B1 | * | 6/2005 | Pfister et al. ................ 345/420 |
| 2002/0080143 | A1 | * | 6/2002 | Morgan et al. ............. 345/581 |
| 2003/0231173 | A1 | * | 12/2003 | Matusik et al. ............. 345/419 |

\* cited by examiner

*Primary Examiner*—Ulka Chauhan
*Assistant Examiner*—Enrique L. Santiago
(74) *Attorney, Agent, or Firm*—Dirk Brinkman; Andrew J. Curtin

(57) ABSTRACT

A method and system generates 3D video images from point samples obtained from primary video data in a 3D coordinate system. Each point sample contains 3D coordinates in a 3D coordinate system, as well as colour and/or intensity information. On subsequently rendering, the point samples are modified continuously according to an updating of the 3D primary video data. The point samples are arranged in a hierarchic data structure in a manner such that each point sample is an end point, or leaf node, in a hierarchical tree, wherein the branch points in the hierarchy tree are average values of the nodes lower in the hierarchy of the tree.

10 Claims, 1 Drawing Sheet

SYSTEM AND METHOD FOR PRODUCING 3D VIDEO IMAGES

FIELD OF THE INVENTION

The invention relates to the field of image processing and image rendering, and more particularly to rendering 3D images in real-time.

RIGHT OF PRIORITY OF FOREIGN APPLICATION

This application claims the benefit of the filing date of prior filed Swiss Patent Application Number 2002 1044/02, filed in the Swiss Patent Office on Jun. 19, 2002.

BACKGROUND OF THE INVENTION

The forming of virtual reality (VR) environments has become possible in the recent past. In such VR environments, a user is provided with impressions, which are perceived to be real. Concepts for rendering a real object in a VR environment are described in an international patent application WO-01/93209, publication date Dec. 6, 2001, by Gross et al., "Method for the production of a virtual reality environment." There, concepts for the concurrently acquiring and rendering 3D image data are described.

The three-dimensional integration of real objects into VR environments entails great challenges with regards to image processing. An interaction of the user with rendered objects is only useful if it occurs in real-time.

Although real-time image acquisition and rendering have been available for 2D representation, the embedding and reproduction of real 3D objects into VR environments has been limited. Although image acquisition and image reconstruction of real objects have been accomplished, the rendering of 3D video data is still in its infancy. This is due to the fact that a series of problems intermingle. One must first acquire 3D information from primary data—generally 2D video images, and these data must be represented and transmitted in a suitable data structure, and finally a high quality rendering must be produced. Existing methods are typically based on triangle meshes or acquired images.

According to mesh technology, video data are acquired and arranged as a mesh of triangles. Rendering meshes has the advantage that existing rendering hardware, e.g., graphic cards, are mostly triangle-based. This has a positive effect on the processing speed. Image-based reproduction essentially renders directly from acquired images with interpolation between camera views. Interpolating between views increases the complexity and decreases the quality.

Therefore, there exists the need for an efficient method for acquiring, processing and rendering 3D video information.

SUMMARY OF THE INVENTION

Rendering images in real-time is important for a virtual reality (VR) application where there is an interaction between objects and users. In this context, real-time rendering means that a sequence of output images is generated as a sequence of input images are acquired, certainly with delays in the order of a second or less. This maximal delay time corresponds roughly to the delay experienced in long distance telephone calls, which still allows for direct and interactive communication between users, without the waiting times being perceived as too annoying.

Thus, it is an object of the invention to provide a system and a method for rendering 3D objects in real-time, independent of transmission and rendering rates. The method for rendering video data according to the invention is based on generating 3D point samples from primary video data in a 3D coordinate system. Each 3D point sample includes 3D coordinates, as well as intensity and colour information, and optionally, surface normals to assist illumination models. The normals can also be used for "splatting" and "back-face culling." The 3D point samples are modified continuously from acquired video data. Although the emphasis of the method according to the invention is on real-time applications, the method can also work with pre-stored images. In the preferred embodiment, that continuously modifies in real-time, the point samples are modified by 3D operators, e.g., delete, update, and insert operators.

The 3D point samples are a 3D realization of "pixels" of 2D images to increase the flexibility of the rendering. The point samples are an "absolute" representation of an object, independent of arbitrary factors such as the placements of the camera. Thus, one can render for any arbitrary viewing angle. As an advantage, the method is independent of how the videos are acquired and rendered. The invention can use any number of data acquisition techniques, which provides geometry, intensity, and colour information in a 3D coordinate system.

In the preferred embodiment, the 3D point samples are arranged hierarchically in a tree-like data structure. This means that all acquired point samples are leaf nodes of the tree. Parent branch nodes in the tree group subordinate child nodes. Node attributes are computed according to predetermined definitions, for example as normalized or weighted averages. The organisation of the data in the hierarchy tree enables a progressive rendering of the data, analogous to known 2D-formats such as the JPEG standard, at multi-levels of resolution. This is useful when the object is small, or the rendering is time-consuming.

DETAILED DESCRIPTION OF THE PREFERRED EMBODIMENT

Figure 1:
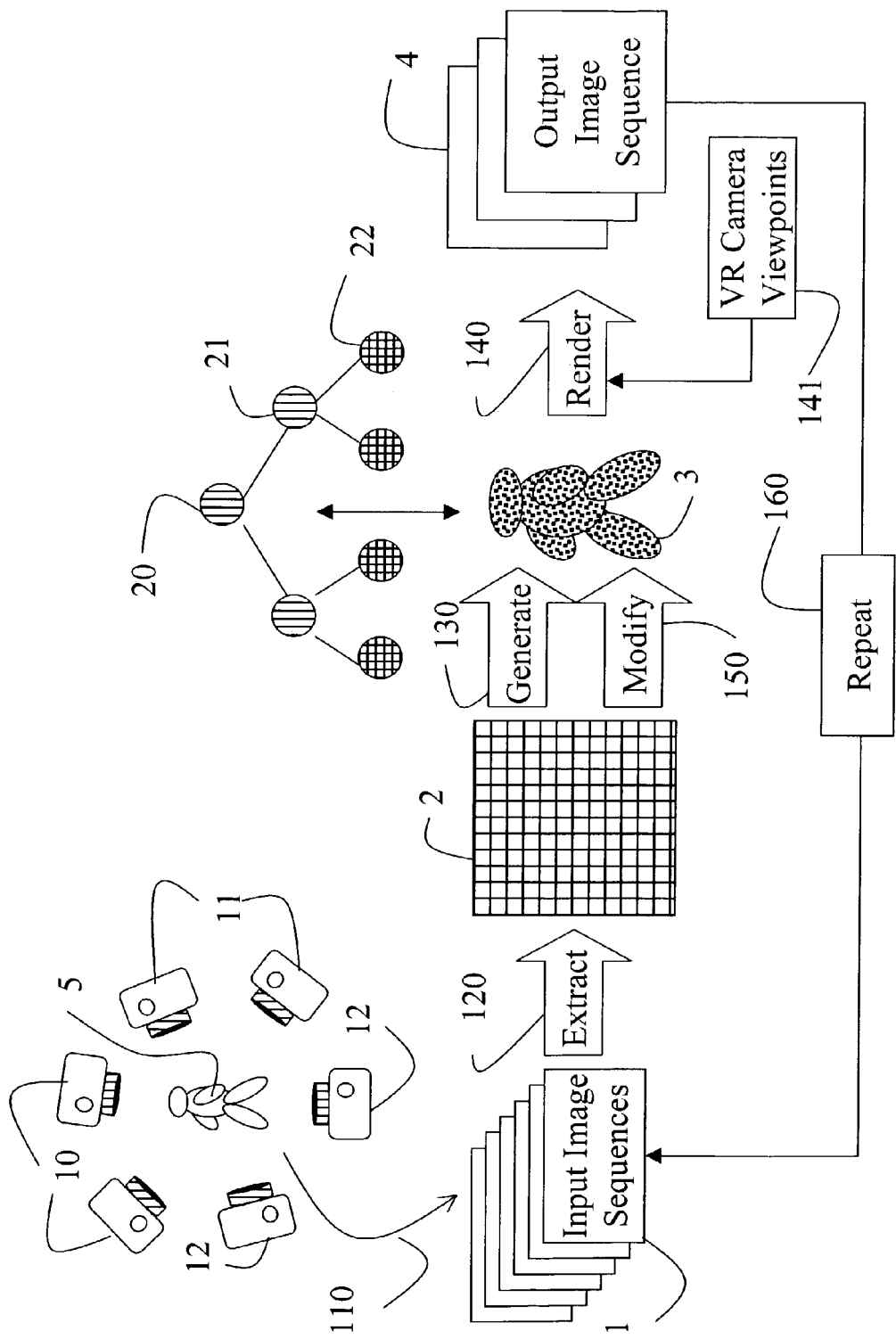
FIG. 1 a schematic of a method for rendering an object in real-time according to the invention.

FIG. 1 show sequences of input images 1, e.g., videos, acquired 100 by cameras 10, 11, and 12 of an object 5. There is one input sequence for each camera. Not all the available images 1 need to be used. Pixels of the input images 1 are analysed to extract 110 3D geometry (coordinates), intensity, colour, and surface normal information 2, on a pixel-by-pixel basis. From the image information, 2D operators are determined for generating 130 3D point samples 3, and the image information 2 is then associated with corresponding 3D point samples 3, preferably stored as a hierarchy 20 in a memory. It should be noted the invention can also operate on black/white images, in which case there is no colour.

Methods for converting 2D images acquired by multiple cameras to 3D point samples are known, see Matusik et al., "*Image Based Visual Hulls*," Proceedings of SIGGRAPH, pp. 369–374, 2000, and Laurentini, "*The visual hull concept for silhouette-based image understanding*," IEEE Transactions on Pattern Analysis and Machine Intelligence, 16(2): 150–162, 1994.

The 3D point samples 3 are rendered 140 as 3D output images 4. In the example described herein, it is assumed that the input videos 1 are acquired for the purpose of integrating the object 5 into a virtual reality (VR) environment.

Subsequently, additional input images 1 are acquired, and the set of point samples are modified 150 and rendered 140 repeatedly 160. The modifying can be considered a selected generation of the 3D point samples, only modifying those point samples for which corresponding pixels in the input images change.

Foreground-background classification is carried out in a first step, using, for example, "chroma-keying." A first Boolean function, fg(p) yields a "T" result if a pixel p(u,v) with 2D image coordinates u,v is in the foreground. A second Boolean function s(p) yields "T" if the pixel p is already present in the data structure 20. A third Boolean function cd(p, $p_{previous}$) yields "T" if there is a difference between a colour of the pixel, and the previously stored corresponding point sample.

By Boolean logic, this gives five categories:

| | |
|---|---|
| same | if fg(p) = T, s(p) = T, cd(p, $p_{previous}$) = F |
| colour change | if fg(p) = T, s(p) = T, cd(p, $p_{previous}$) = T |
| new | if fg(p) = T, s(p) = F |
| deleted | if fg(p) = F, s(p) = T |
| background | if fg(p) = F, s(p) = F |

The method detects differences between the images 1 and the corresponding point samples 3. Therefore, the operators are defined only for pixels which change their corresponding point samples. The colour is changed by a colour update operator. The geometry (position) is changed by geometry update operator, a delete operator deletes point samples, and an insert operator produces new point samples. Because a change in colour can reflect a change in position, 3D point samples are deleted after certain length of time, which can be fixed or dynamically determined, thus each point sample has an associated time value.

In a next step, 3D operators are allocated to the 2D operators. With respect to the insert operator, an allocation I:(u,v,c)→(x,y,z,c,n) is sought, wherein x,y,z are 3D coordinates in a 3D coordinate system, c is colour information, and n is normal information. The evaluation of the 3D update and delete operators from the corresponding 2D operators is as follows: for a pixel (u,v) affected by one of the two operators, only determine the associated 3D point sample (x,y,z).

Finally, the 3D point samples are modified continuously while the output sequence of image 4 is produced. The exact appearances of the output images depend of course on a virtual position 141 of an observer (VR camera), see the international patent application WO-01/93209.

The cameras 10–112 operate according feedback information received from the VR environment, for example, cameras 10 are active and all attributes of the 3D point samples, i.e., geometry, intensity, colour and normals, colour, are used. Cameras 11 are also active, however, only geometry and normal information are used, intensity and colour information are not used. Cameras 12 are inactive.

The general arrangement of 3D point samples into a hierarchy tree is well known. In the selected coordinate system, the method according to the invention ensures that the distance between a parent point sample and a subordinate child point sample at a lower level is always smaller than the distance of parent point samples on the same level, in other words, the branching in the hierarchy tree is not equal at all locations.

In substance, the data structure 20 has the following properties, the 3D point samples 3 are stored at bottom-level leaf nodes 22, connected to other leaf nodes via 'parent' branch nodes 21. The leaf nodes can be empty. Each branch node stores 3D coordinates, intensity, colour and normal information, and at least one explicit or implicit pointer to a lower child node. Volumes an be associated with branch nodes or leaf nodes, and the tree represents a regular subdivision of a volume represented by the root node. If the entire volume is represented as a cube, with side lengths $s_0$, then the side length of a certain sub-volume $s_d$ with at a branch depth d is given by $s_d = s_0/(\sqrt[3]{k})^d$, where $k=s^3$, and s is 3. If one considers the dimensions of the environment from which the 3D point samples is acquired, then a limit branch depth $d_{lim}$ represents a limit on an obtainable or desired precision. All branch nodes of the hierarchy tree with a smaller division have $d > d_{lim}$ as a "cut off" value, so that branch nodes can become "leaves" of the hierarchy tree. In order to reduce memory requirements, the hierarchy tree can be compressed, see Jacobsen, "*Space-efficient Static Trees and Graphs*," Proceedings of the IEEE Symposium on Foundations of Computer Science, pp. 549–554, 1989. Position or geometry information can be approximated, If the position is expressed relative to a centre or an other fixed point of a volume, then less memory is required. This property is of particular interest in applications where the data structure 20 is static. Approximate coordinates can be refined with differences in a local coordinate system using a Laplace quantiser for compression. One bit is used to indicate whether a node is a leaf node, or not.

If there are high-frequency colour changes, i.e., a lot of textures, adjacent point samples can have significant different colour values. Thus, difference coding is of little use. For this reason, a direct procedure is preferred, instead of using redundancies in the hierarchal data structure. The colours are represented in the YUV format, with the Y-components using twice as many bits as the U- and V-components.

Normals are stored as normalized vectors with quantised spherical angular coordinates. Averaging is useful, and special data structure can be used.

Additional compression can be achieved by exploiting redundancy in the temporal sequence, because the 3D video images transform only slowly, or by entropy coding. The preferred embodiment uses "Range Coding," see Martin, "*Range encoding: an algorithm for removing redundancy from a digital message*." Video & Data Recording Conference, U.K., July 1979. A result, the hierarchic data structure is particularly suitable for real-time rendering.

During generation of the data structure, the delete operator is applied first, followed by the update operator, and the insert operator last. The application of the operators can lead to geometry changes. Geometry changes are detected by examining sets of samples corresponding to the input images. If 3D distance differences of a set of samples exceed a certain threshold, the position of the sample is update by the update geometry operator.

The application is progressive according to the top-to-bottom order of the hierarchical structure of the tree. Regions of acquired images are refined in a coarse-to-fine order. Thus, drastic changes first appear coarse, which are only then gradually refined. However, there is always some point samples that permit a consistent and up-to-date representation of the object. Because that the distance between child nodes of a common parent node is smaller than the distance between any nodes at the level of the parent node, there is no direct relationship between the order of the insert operators and the progressive representation from the tree data structure.

Point samples produced by prior insert operators are higher in the hierarchy tree, since as a whole many points are still not present due to the coarse resolution. They are therefore reproduced more coarsely. As more sample points are inserted, these new points change their positions in the tree, according to the condition that the distance between child nodes of a common parent node is smaller than the distance between any nodes at the level of the parent node. The point samples which have just been produced according to the design configuration however are always "leaves" of the hierarchy tree.

It is also possible to pre-process the images to achieve additional 3D effects, such as well known Phong illumination, which uses normal information. In addition, a "depth compositing" can be used to ensure that object located in the background appears in the background.

The method can also apply a "reproduction operator" directly on the information associated with point samples, instead of on pixels. For example, a sinusoidal wave operator with a varying amplitude and frequency can distort or warp the output images. Other reproduction operators include illumination operators, particle system operators which influence the velocity and duration of point samples to simulate "beaming" and explosions.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating output images, comprising:
   acquiring a sequence of input images of an object;
   generating, while the sequence of input images is acquired, a set of point samples representing the object from the sequence of input images, in which each point sample has 3D coordinates and intensity information; in which the set of point samples is arranged in a hierarchy tree such that each point sample is associated with a leaf node in the hierarchy tree, and branch nodes are associated with average values of the information in lower nodes in the hierarchy tree, and in which a distance between parent and child nodes in the hierarchy tree is smaller than any distance between nodes at a same level as the parent node;
   rendering, while the sequence of input images is acquired, the set of point samples as a sequence of output images of the object;
   modifying the set of point samples according the sequence of input images, and
   repeating the rendering and modifying as long as the sequence of input images is acquired.

2. The method of claim 1, in which each point sample includes colour information.

3. The method of claim 1, in which each point sample includes surface normal information.

4. The method as in any one of the preceding claims, in which a particular point sample is modified by a 3D operators selected from the group consisting of a delete operator, an insert operator, and an update operator.

5. The method of claim 4, in which the update operator includes a colour update operator and a geometry update operator.

6. The method of claim 4, in which the delete operator is applied first.

7. The method of claim 1, in which a reproduction operator modifies a particular point sample directly.

8. A method for generating a video, comprising:
   acquiring a sequence of input images of an object;
   maintaining a set of point samples representing the object from the sequence of input images, in which each point sample has 3D coordinates and intensity information; in which the set of point samples is arranged in a hierarchy tree such that each point sample is associated with a leaf node in the hierarchy tree, and branch nodes are associated with average values of the information in lower nodes in the hierarchy tree, and in which a distance between parent and child nodes in the hierarchy tree is smaller than any distance between nodes at a same level as the parent node; and
   rendering the set of point samples as a sequence of output images from an arbitrary point of view of the object while acquiring the sequence of input images and maintaining the set of point samples.

9. The method of claim 8, in which the sequence of input images is concurrently acquired by a plurality of cameras.

10. A system for generating a video, comprising:
   a plurality of cameras acquiring a sequence of input images of an object;
   a memory storing a set of point samples representing the object, in which each point sample has 3D coordinates and intensity information, in which the set of point samples obtained from the sequence of input images is arranged in a hierarchy tree such that each point sample is associated with a leaf node in the hierarchy tree, and branch nodes are associated with average values of the information in lower nodes in the hierarchy tree, and in which a distance between parent and child nodes in the hierarchy tree is smaller than any distance between nodes at a same level as the parent node; and
   a rendering engine configured to render the set of point samples as a sequence of output images from an arbitrary point of view of the object while acquiring the sequence of input images and maintaining the set of point samples.

* * * * *